J. C. CONROD.
EDUCATIONAL APPLIANCE.
APPLICATION FILED FEB. 18, 1913.

1,213,839.

Patented Jan. 30, 1917.
6 SHEETS—SHEET 1.

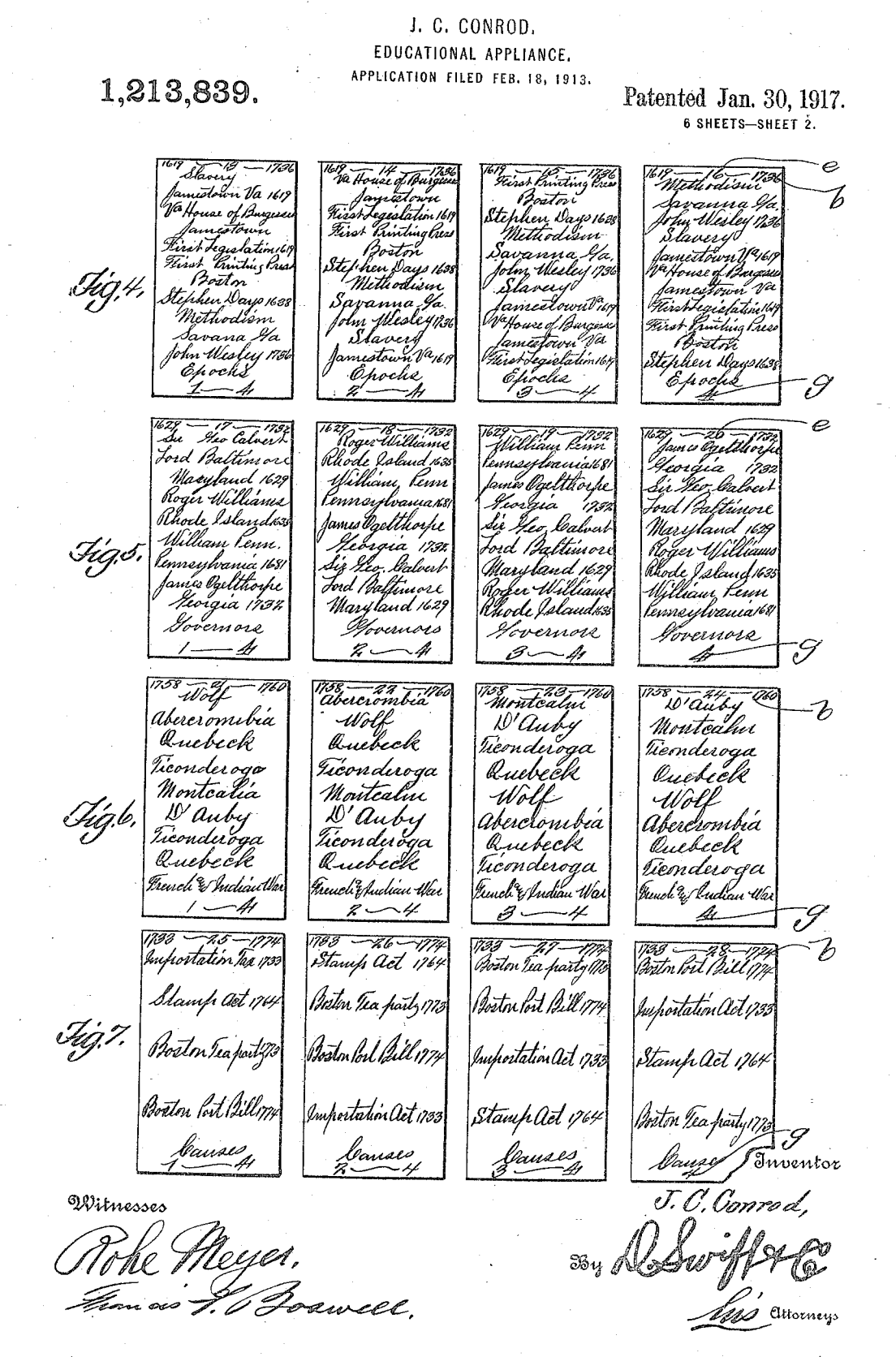

J. C. CONROD.
EDUCATIONAL APPLIANCE.
APPLICATION FILED FEB. 18, 1913.

1,213,839.

Patented Jan. 30, 1917.
6 SHEETS—SHEET 2.

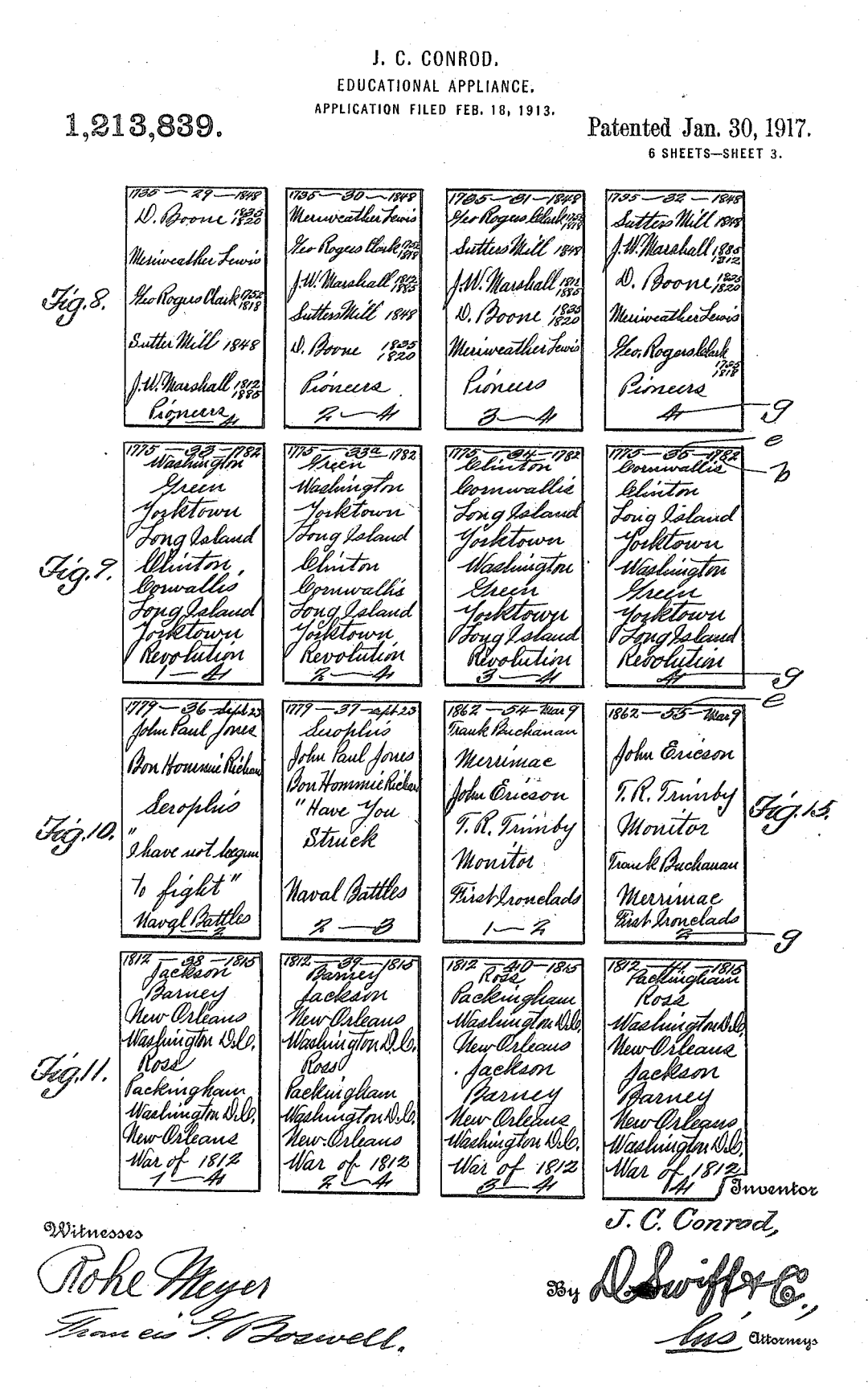

J. C. CONROD.
EDUCATIONAL APPLIANCE.
APPLICATION FILED FEB. 18, 1913.

1,213,839.

Patented Jan. 30, 1917.
6 SHEETS—SHEET 3.

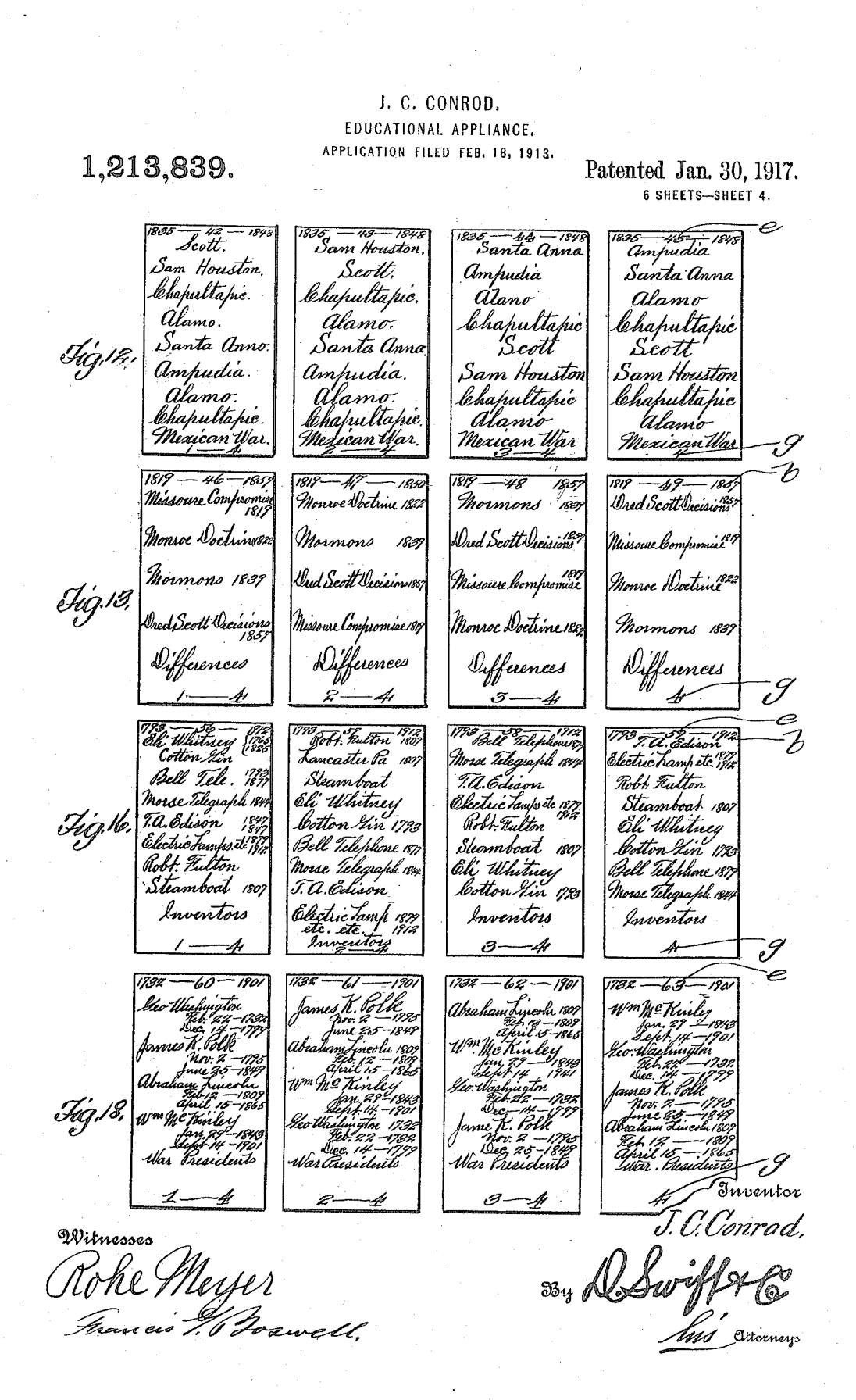

J. C. CONROD.
EDUCATIONAL APPLIANCE.
APPLICATION FILED FEB. 18, 1913.

1,213,839.

Patented Jan. 30, 1917.
6 SHEETS—SHEET 4.

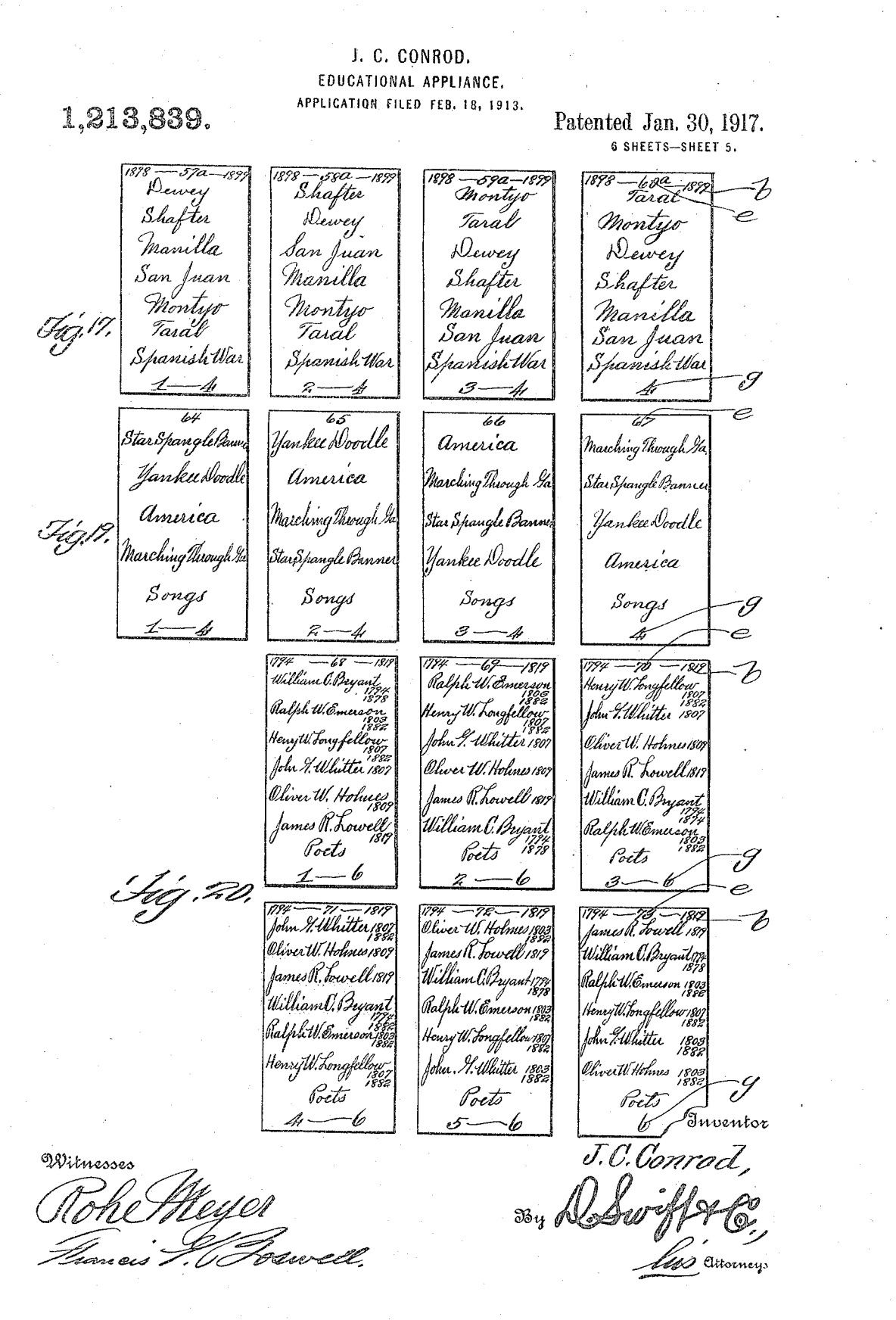

J. C. CONROD.
EDUCATIONAL APPLIANCE.
APPLICATION FILED FEB. 18, 1913.

1,213,839.

Patented Jan. 30, 1917.

6 SHEETS—SHEET 5.

J. C. CONROD.
EDUCATIONAL APPLIANCE.
APPLICATION FILED FEB. 18, 1913.

1,213,839.

Patented Jan. 30, 1917.

6 SHEETS—SHEET 6.

Fig. 21.

| 74 | 75 | 76 | 77 |
|---|---|---|---|
| Washington B. day Feb. 22 1732 | Mothers Day Sec. Sunday May | Independence Day July 4th | Christmas Dec. 25th |
| Mothers Day Sec. Sunday May | Independence day July 4th | Christmas Dec. 25th | Washington B. Day Feb. 22 - 1732 |
| Independence July 4 | Christmas Dec. 25 | Washington B. Day Feb. 22 - 1732 | Mothers Day Sec. Sunday May |
| Christmas Dec. 25th | Washington B. Day Feb. 22 - 1732 | Mothers Day Sec. Sunday May | Independence Day July 4 |
| Holiday's | Holidays | Holidays | Holidays |
| 1 — 4 | 2 — 4 | 3 — 4 | 4 |

Fig. 22.

| 1753—78—1789 | 79 | 80 | 1706—81—1790 |
|---|---|---|---|
| Special Patrick Henry "Give me Liberty or Give me death." Add 2 points | Special Robert Morris Add 1 Points | Special Lafayette Add 2 points | Special Ben Franklin Jan. 17th 1706 1790 Add 2 points |
| 1 — 12 | 2 — 12 | 3 — 12 | 4 — 12 |
| 82 | 1741—83—1801 | 1808—84—1889 | 1843—85—1901 |
| Special Aaron Burr Forfiet 2 points | Special Benidict Arnold Quebeck Saratoga West Point Forfiet 3 points | Special Jefferson Dav. Forfiet 5 points | Special Wm McKinley Add 3 points |
| 5 — 12 | 6 — 12 | 7 — 12 | 8 — 12 |
| 1809—86—1865 | 87 | 1743—88—1826 | 1859—89 |
| Special Abraham Lincoln Add 10 points | Special John Doe add a loud Noise | Special Thomas Jefferson Add 3 points | Special John Brown Forfiet one Point |
| 9 — 12 | 10 — 12 | 11 — 12 | 12 — 12 |

Witnesses
Robe Meyer,
Frances T. Boxwell.

Inventor
J. C. Conrod,
By D. Swift & Co.
his Attorneys

UNITED STATES PATENT OFFICE.

JOSHUA C. CONROD, OF CEMENT, OKLAHOMA.

EDUCATIONAL APPLIANCE.

1,213,839.　　　Specification of Letters Patent.　　Patented Jan. 30, 1917.

Application filed February 18, 1913.　Serial No. 749,103.

*To all whom it may concern:*

Be it known that I, JOSHUA C. CONROD, a citizen of the United States, residing at Cement, in the county of Caddo and State of Oklahoma, have invented a new and useful Educational Appliance; and I do hereby declare the following to be a full, clear, and exact description of the invention, such as will enable others skilled in the art to which it appertains to make and use the same.

This invention relates to the art of educational appliances, and particularly to a new and useful educational card game appliance. It is borne in mind that there has been produced such educational appliances, therefore such an appliance is not claimed broadly.

However, as one of the objects of the invention, it is the aim to provide an apparatus of this nature, that will not only be instructive and educational to persons or players, but will lend amusement, as well as an interesting game of chance. As far as can be ascertained there is no game or educational appliance of this nature, that will educate and instruct persons as to the progress of the development of the people of the world, their achievements, and in regard to the evolution of the world itself, beginning at the early stages of the year 982 A. D., substantially up to the present stage.

It is an essential object of this invention to provide such an instructive appliance, as will be ascertained from the accompanying specification, in conjunction with the annexed drawings, which illustrate the entire appliance.

An object of the invention is the provision of a pack of cards, 93 in all. This pack or series of cards are numbered consecutively in numerical order, and are divided into groups, which consist of 2, 4, 6 or 12 cards. These groups are not only distinguished numerically, but are further distinguished, according to the different stages of the world's progress, as well as by famous persons and their achievements with their dates.

Speaking more specifically the various groups are entitled Discovery, Settlers, Settlements, Epochs, Governors, French and Indian War, Causes, Pioneers, Revolution, Naval battles, War of 1812, Mexican War, Differences, Rebellion, First iron-clads, Inventors, Spanish War, War Presidents, Songs, Poets, Holidays, and "Special." It will be seen that the cards are not only distinguished consecutively in numerical order, but in historical order.

The invention comprises further features and combination of parts as hereinafter set forth, shown in the drawings and claimed.

In the drawings: Figure 1 is a view showing the group of cards entitled Discovery. Fig. 2 is a view of the group entitled Settlers. Fig. 3 shows a group distinguished as Settlements. Fig. 4 is another group called Epochs. Fig. 5 is a suit distinguished as Governors. Fig. 6 another suit entitled French and Indian War. Fig. 7 another group called Causes. Fig. 8 illustrates a suit distinguished as Pioneers. Fig. 9 is a group named Revolution. Fig. 10 discloses a suit entitled Naval battles. Fig. 11 is a group of cards distinguished as War of 1812. Fig. 12 is another group called Mexican War. Fig. 13 another group entitled Differences. Fig. 14 shows a suit called Rebellion. Fig. 15 shows a suit consisting of two cards entitled First iron-clads. Fig. 16 is a group entitled Inventors. Fig. 17 is another group entitled Spanish War. Fig. 18 shows a view called War Presidents. Fig. 19 is another group distinguished as Songs. Fig. 20 is a view of six cards entitled Poets. Fig. 21 is a group called Holidays. Fig. 22 is a group of twelve cards distinguished as "Special".

Referring more especially to the drawings it will be seen, as before stated, the cards are divided into groups consisting of two, four, six, or twelve cards, and to make a complete "epoch" all the cards of any one group must be held by one player. The dates of each discovery, settlement, development, or the events or achievements of famous persons, are on each card of an epoch, and the earliest event or development with or without a person is placed at the top of the first card of each group, and the next event or development or achievement at the top of the second card of each group, and so on until all are shown. All events or dates appear on all cards of each epoch in order of their progression. This is also applied in regard to the settlements or populations of cities. The epochs of any war are arranged according to consecutive occurrence of battles, and the occurrences of achievements of the commanders thereof. For instance, the winning side appearing with its commanders at the top of the first card of such epoch; the names of the commanders are followed immediately by their battles, and the losing commanders appearing lower down on the first card with battles they have won at the top in order of the progression. If losing commander won no battles, none appear. The earliest date $a$ of a battle, event or achievement, settlement, discovery, wars, songs or the like, or the beginning of an eventful life of certain men, appears on one of the upper corners of all the cards of each epoch, and the latest date $b$ on the opposite corner, as shown in the drawing. Other dates $c$ appear consecutively in their order, and under certain events or achievements, or names of certain prominent or famous persons.

The holidays are taken in the order of their occurrence in the year. Songs are used in order of the dates they were written. Composer and date may appear under the title of each song. In regard to naval battles, names of ships may be used with or without the commander.

A certain group of cards $d$ of this instructive educational game contain names of persons famous in their countries' history. This certain group of cards $d$ are called "Special", and which call for additional points or for a forfeit. These points are to be added or subtracted at the end of the game. Quotations or special events or achievements, with some of their dates, which are peculiar to the famous persons, appear on the "Special" cards.

The numbers $e$ at the top of each card designate it numerically in the pack, earliest epoch coming first, and so on to the end of epochs, which are followed by the "Special" cards, the highest number showing how many cards are in the pack.

The small numbers $g$ at the bottom indicate how many cards in each division or group; also shows what number each card is in each division or group.

The object of this instructive appliance is to furnish a game, which will not only lend amusement and an interesting game of chance, but will enlighten, instruct or educate persons or players. The "Special" cards are to add to the interest of the game by adding an element of chance.

*Rules for playing.*—The pack of cards may be divided, and only half used. "Special" cards may also be divided, the consecutive lower numbers with one part of the pack, and the consecutive higher numbers with the other part. The name of each division or group in this game is "Epoch". The "epochs" or groups are divided into two, four or six cards, and the group entitled "Special" consists of twelve. The "Special" cards (which state "Add so many points") count for player, and against the player, when the card states "Forfeit", for instance, as much for which the card calls. To count game, each card counts one point, and the "Special" cards add or subtract as the case may be. One of the "Special" cards, on which it is written "John Doe", has stated thereon, "Add a loud noise", and when player holds this card, he is to whoop, thereby lending amusement to the game. Player gaining largest number of points wins the game. The game may be played by two or more persons, as partners or singly.

Four cards are dealt, each person dealing in turn. First person or player on the left of dealer calls for a desired card from any opponent player, to complete a group or division, of which he holds part, and shall call as long as he receives the card for which he calls. When call is missed, the players shall draw from the pack, which is placed between the players, and if the desired card is drawn, the player is entitled to call again from his opponent players, as if the card drawn came from an opponent player. As soon as a call or a draw is missed, the next person on the left calls or draws, and so on around until pack is exhausted. When a player is exhausted of cards, either from calls or by completing groups, the player shall draw from the pack four more cards and continue as before. A person calling for a card which he holds, forfeits said card to the opponent person or player from whom it is called. A complete group must contain a card for each event or person of that group, as shown by the small numbers $g$ at bottom of card. When a group is complete, it is laid aside to be counted at the end of the game.

A very simple and easy way to play the game is to call for the numbers at the top and bottom of each group or epoch, until the group is complete. A careful player will memorize all the achievements, events or developments, and the dates of the occurrence of the same.

The invention having been set forth, what is claimed as new and useful is:—

A card game apparatus comprising a pack of substantially ninety-four cards divided into twenty-one different groups, nineteen of which consisting of four cards to each group, the twentieth group consisting of six cards, and the twenty-first group twelve cards, whereby the pack of cards may be divided into two decks of equal number of cards each, each group being distinguished by historical periods, each card of each group being distinguished by a world famous person, the cards of the whole pack being numbered chronologically, each group being further distinguished numerically, the group consisting of twelve cards being distinguished as special cards, indicative of points to be added or points to be forwarded or subtracted in counting the game, a single card associated with and completing the twelve cards to the special group and having means whereby it is distinguished individually from the cards of the special group and individually distinguished from the cards of the other groups, and indicative of amusement and merriment to the game.

In testimony whereof I have signed my name to this specification in the presence of two subscribing witnesses.

JOSHUA C. CONROD.

Witnesses:
 FLOYE B. COLLINS,
 A. E. ROLAND.

Copies of this patent may be obtained for five cents each, by addressing the "Commissioner of Patents. Washington, D. C."